Aug. 3, 1948.  S. L. SHIVE  2,446,195
TESTER FOR ELECTRICAL SHIELDINGS
Filed March 14, 1945
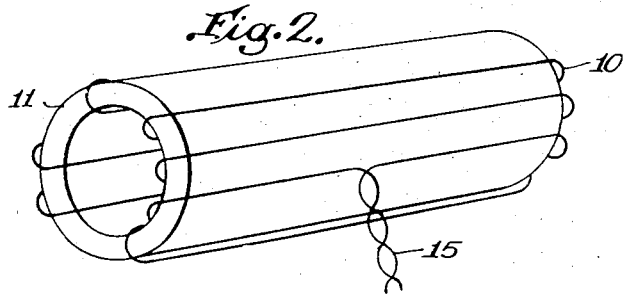
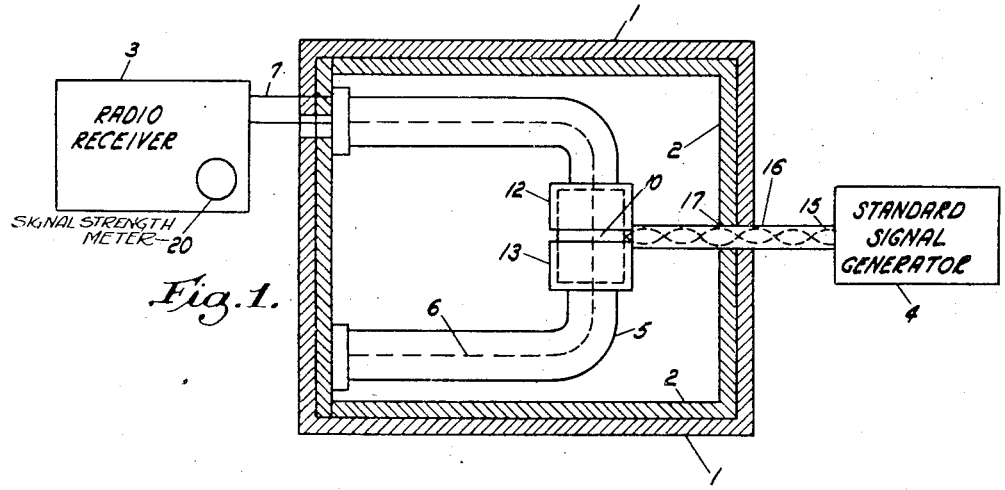
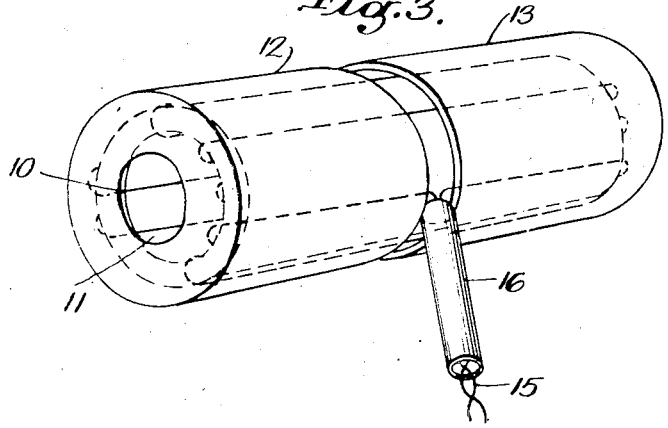
INVENTOR.
SCOTT L. SHIVE
BY
*William D. Hall*
ATTORNEY Patented Aug. 3, 1948

2,446,195

UNITED STATES PATENT OFFICE 2,446,195

TESTER FOR ELECTRICAL SHIELDINGS

Scott L. Shive, Detroit, Mich., assignor to the United States of America as represented by the Secretary of War Application March 14, 1945, Serial No. 582,781

1 Claim. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical testing devices and more particularly to a means and a method for measuring the electrical characteristics of a conduit in shielding electrical radiation or induction from a conductor that is disposed within the conduit.

The objects of the present invention comprise the provision of a piece of test equipment for and a method of measuring the effectiveness of an electrical shield provided by a conduit; and to provide a simple and quantitative device for and method of measuring the extent to which the electrical field in the region about a conductor is attenuated by the insertion of a conduit shield.

With the above and other objects in view which will be apparent to those who are informed in the field of electrical testing apparatus and methods, a suitable illustrative embodiment of an apparatus for use in the exercise of the present invention is shown in the accompanying drawing, wherein:

Fig. 1 is a block diagram and a structural sectional view of a test cabinet device assembly that embodies the present invention;

Fig. 2 is a perspective view of an exciter coil that forms a part of the assembly that is shown in Fig. 1; and Fig. 3 is a perspective view of a cylindrical shield for disposition outwardly of the coil that is shown in Fig. 2.

The electrical system that is embodied in the piece of electrical test equipment that is contemplated in the present disclosure comprises a conduit testing cabinet 1, the interior of which preferably is shielded by being lined throughout with a continuous conductive lining 2 of copper foil or the like, a detector circuit, as for example a radio receiver 3 and a signal generator 4. The continuous conductive lining 2 of the cabinet 1 serves to confine electrical fields substantially entirely within the chamber or cabinet 1 as in the usual type of screened cabinet.

The cabinet 1 is adapted for having a conduit 5 or other device to be tested, removably disposed therein for purposes of being tested electrically in two stages, one stage with both ends of the non-magnetic conduit 5 in electrical contact with the cabinet conductive liner 2, and the other stage with one end only of the conduit 5 connected electrically to the liner 2.

An insulated conducting pick-up wire 6 extends coaxially of and substantially centrally of the conduit 5, with one of its ends in electrical contact with the cabinet liner 2 and its opposite end connected with the input terminal of the radio receiver 3. The receiver return circuit is completed by a conductor 7 between ground terminal of the radio receiver 3 and the conducting liner 2 of the cabinet 1. A signal strength meter 20 is disposed within the receiver 3.

An exciter coil 10 is disposed substantially midway between the ends of the conduit 5 and inwardly of the cabinet liner 2. The coil 10 is of cylindrical shape and is positioned outwardly and circumferentially substantially coaxially of the conduit 5 and insulated therefrom in any desired manner. A pair of cylindrical axially separated electrically conducting non-magnetic shields 12 and 13 are disposed circumferentially outwardly of and insulated from the coil 10 adjacent the opposite ends thereof. The shields 12 and 13 are connected electrically at their spaced ends with a tubular shield 16 that extends therefrom through a wall of the cabinet 1. The shields 12 and 13 are closed at their outer ends except for openings to clear conduit 5.

The coil 10 is wound with its turns of wire extending axially of a substantially cylindrical insulating core 11 along the inner and the outer surfaces thereof as shown in Fig. 2 of the drawings. The number of turns of wire that comprise the coil 10 varies with the frequency of the electrical current used and preferably is within the range of from four to thirty turns. The wall of the insulating core 11 is of sufficient thickness so that winding of coil 10 departs materially form a non-inductive winding and so that current flowing in coil 10 will set up an appreciable field about the coil axis.

The ends of the wire comprising the coil 10 are connected through a pair of leads 15 to the standard signal generator 4. The leads 15 are disposed within the conducting tubular shield 16 that is connected electrically to the electrically conducting lining 2 of the cabinet 1, preferably at the junction 17 therebetween.

In a first method of measurement the procedure is as follows: In the first stage of operation, signal of a desired frequency and of a substantially high intensity is supplied by the signal generator 4 through the leads 15 within the shielding tube 16 to the exciter coil 10. Conduit 5 is in place with its ends grounded to the lining 2 as previously explained. The energization of the exciter coil 10 generates a strong radio frequency field in the space within the coil. The magnitude of the electro-motive force that is induced within the wire 6 is influenced by the shielding presence of the conduit 5. Any imperfections of shielding in the conduit 5 permits pick-up of signal by the wire 6 which thereupon transmits signal to the receiver 3. The strength of the signal that is so transmitted is read upon the signal strength meter 20 is the receiver 3.

A second stage of the first method of measurement comprises the removal of the conduit 5 from the cabinet 1 with the wire 6 remaining in place therein. The output from the signal generator 4 is then reduced until the signal strength, as read upon the signal strength meter 20 in the receiver 3 is the same as that read in the first stage of the measurement procedure with the conduit 5 within the cabinet 1. The ratio of the two readings of the output of the generator 4 at the first and second stages of the measurement procedure is taken as a measure of the shielding that is provided by the conduit 5. If the signal frequency is sufficiently low, this procedure may be modified by the insulation of either end of the conduit 5 from the conductive lining 2 of the cabinet 1, instead of the removal of the conduit 5 therefrom.

A second method of measurement for measuring the effectiveness as shielding of the conduit 5, comprises the maintenance of a fixed signal strength output from the generator 4 in both stages of the procedure. The reading of the signal strength meter 20 with conduit 5 in the first stage disposition is taken and the reading of signal strength meter 20 with conduit 5 in the second stage disposition is taken. The ratio of these two signal strength meter readings is a measure of effectiveness of shielding of conduit 5. The procedure is otherwise the same as in the first method of measurement.

An alternative structure for measuring the effectiveness as shielding of conduit 5 with the components of apparatus above described is to interchange the signal generator and the receiver in the circuits. With this alternative structure signal in the wire 6 is picked up by coil 10. The two methods of measurement above described are available for use with this alternative structure also.

It is necessary when the adjustments are changed from the first stage to the second stage that the impedances of the pick-up circuit and of the exciter circuit do not change appreciably. It has been found that for many cases the structure which I have disclosed is adequate in this regard. The constancy of impedances is improved by keeping down the number of turns in the exciter coil 10. The impedances in question may also be kept constant by tuning and re-tuning the input circuit of receiver 3 and the output circuit of signal generator 4. These devices 3 and 4 are commonly provided with such tuning means not shown.

It is to be understood that the construction, assembly and the methods of making measurements therewith, that have been shown and described herein have been submitted for the purposes of illustrating and describing an embodiment of the present invention and that similarly operating modifications and changes may be made therein without departing from the present invention as defined by the appended claim.

What I claim is:

A conduit testing device, comprising in combination a cabinet having an electrically conductive lining, and adapted to receive a U-shaped conduit of electrically conductive material with its ends in contact with the lining, a detector circuit, a signal generator, a conductor disposed coaxially relative to the positioned conduit and having one end in electrical engagement with the conductive lining of said cabinet and its opposite end in electrical connection with the input of said detector circuit, a shielded exciter coil disposed circumferentially outwardly of said conduit intermediate the ends thereof, and shielded leads connecting said generator with said coil for conducting electrical signal therebetween, the mentioned conductor being adapted to pick up energy from the exciter coil and feed it to the detector circuit.

SCOTT L. SHIVE.

REFERENCES CITED

The following references are of record in the file of this patent:

UNITED STATES PATENTS

| Number | Name | Date |
|---|---|---|
| 1,474,382 | Round | Nov. 20, 1923 |
| 2,312,687 | Curtis | Mar. 2, 1943 |
| 2,378,928 | Johnson, Jr., et al. | June 26, 1945 |
| 2,388,049 | Goode | Oct. 30, 1945 |
| 2,390,489 | Archenbrown | Dec. 11, 1945 |

OTHER REFERENCES

Bureau of Standards Research Paper No. 158, (Reprint from Bureau of Standards Journal of Research, vol. 4, March 1930), pages 423, 424.